United States Patent [19]
Grüschow et al.

[11] Patent Number: 6,022,080
[45] Date of Patent: Feb. 8, 2000

[54] PROCESS AND SYSTEM FOR THE SOLUTION MINING OF EVAPORITES AND PREPARATION OF SALINE SOLUTIONS

[75] Inventors: Norbert Grüschow, Sondershausen; Frank Klaus Horst Walkhoff, Berlin-Marzahn; Wolfgang Ulrich, Sondershausen, all of Germany

[73] Assignees: Kavernen Bau- und Betriebs-GmbH, Hannover; deusa Projekt Management GmbH, Bleicherode, both of Germany

[21] Appl. No.: 08/905,498

[22] Filed: Aug. 4, 1997

[30] Foreign Application Priority Data

Aug. 3, 1996 [DE] Germany .................. 196 31 520

[51] Int. Cl.⁷ .......................................... E21B 43/28
[52] U.S. Cl. .......................... 299/4; 60/641.8; 299/5
[58] Field of Search ........................ 299/4, 5, 6; 405/55, 405/56, 58; 60/641.8, 641.13; 23/303, 302 T

[56] References Cited

U.S. PATENT DOCUMENTS

| | | | |
|---|---|---|---|
| 2,161,800 | 6/1939 | Cross ........................................ | 299/4 X |
| 3,386,768 | 6/1968 | Jacoby et al. .............................. | 299/4 |
| 4,072,472 | 2/1978 | Lukes ....................................... | 299/5 X |
| 4,211,613 | 7/1980 | Meckler .................................... | 203/11 |
| 4,475,771 | 10/1984 | Atwood et al. ............................ | 299/4 |

FOREIGN PATENT DOCUMENTS

| | | |
|---|---|---|
| 155 316 | 6/1982 | Germany . |
| 1393 54 | 5/1983 | Germany . |
| 206 179 | 1/1984 | Germany . |
| 208 389 | 5/1984 | Germany . |
| 3422 481 | 12/1985 | Germany . |
| 235 559 | 5/1986 | Germany . |
| 271 731 | 9/1989 | Germany . |
| 271732 | 9/1989 | Germany . |
| 277 718 | 4/1990 | Germany . |
| 85 27 665 | 2/1991 | Germany . |
| 291 601 | 7/1991 | Germany . |

OTHER PUBLICATIONS

Kalisalzgewinnung durch gelenktes Aussolen—Bergakademi 17.Jg. Hfet Nov. 11, 1965.
Operation of a Potassium Ore Pilot Cavern, Solution Mining Research Institute, 1994.
Salt Ponds: Energy Phenomenon, Compressed Air Magazine, Jan. 1986.

*Primary Examiner*—George Suchfield
*Attorney, Agent, or Firm*—Cohen, Pontani, Lieberman & Pavane

[57] ABSTRACT

A process and a system for the solution mining of evaporites and preparation of the obtained saline solution and in particular for the dissolution of salts, evaporation and cooling of the obtained saline solution, and crystallization of salts under subtropical and tropical climatic conditions. The invention can also be applied for the preparation of naturally occurring saline solutions. In the process and system of the invention, a solvent is heated in a solar pond by means of solar energy to a temperature above ambient condition and up to approximately 60° C. to 80° C. The heated solvent is introduced into a cavern to be solution mined to produce a production brine which is heated. The heated production brine leaves the cavern and is then cooled along with water evaporation whereby solids crystallize and separate producing a solid product and a cold mother solution.

18 Claims, 3 Drawing Sheets

PROCESS AND SYSTEM FOR THE SOLUTION MINING OF EVAPORITES AND PREPARATION OF SALINE SOLUTIONS

BACKGROUND OF THE INVENTION

The invention is directed to a process and a system for the solution mining of evaporites and preparation of the obtained saline solution, in particular for the dissolution of salts, evaporation and cooling of the obtained saline solution, and crystallization of salts under subtropical and tropical climatic conditions. The invention can also be used for the preparation of naturally occurring saline solutions.

The amount of energy required for evaporating water out of a saline solution corresponds to the evaporation heat of water from the respective saline solution. Two techniques are known from the prior art to accomplish this. In the first technique, the saline solution is heated to boiling. The solution boiling point can be lowered by applying a vacuum. This type of water evaporation is carried out in specially constructed evaporating installations. Primary energy use can be reduced to a reasonable level through the utilization of waste heat and secondary energy. In addition to concentrating the saline solution, the use of evaporating installations is also suitable for obtaining and recovering the water as a condensate.

Solar evaporation is used only for concentrating saline solutions. In solar evaporation systems, water is evaporated out of a saline solution which is introduced in large evaporation pools. This evaporation is performed at a very low air humidity at the ambient or surrounding temperature and atmospheric pressure. The evaporated water escapes to the atmosphere and, in contrast to the first-mentioned technique, can not be recovered.

Obviously, solar evaporation is only possible or economically feasible under determined climatic conditions. However, under favorable climatic conditions such as those in the Dead Sea, solar evaporation of saline solutions is economically superior to water evaporation in evaporation plants.

A high-intensity solar radiation similar to that in the Dead Sea region is found in numerous subtropical and tropical regions. However, the air humidity is usually too high for effective water evaporation or the amount of precipitation largely compensates for the quantity of water evaporated. Also, when taking advantage of seasonal dry periods, the required dimensions of the evaporation pools are so large as to render an economical solar evaporation impossible.

Consequently, in these cases evaporation plants are resorted to even though these plants often are not as energy favorable as in temperate regions because of high outside temperatures.

Examples of applications which demonstrate the great variety of the prior art described above are found in the fields of NaCl—boiled salt production, potash fertilizer production, and seawater desalination.

Likewise, it is generally known that water evaporation is also carried out when heated cooling water or condensing water is cooled in cooling towers. Naturally, this water evaporation effect also occurs in the much less commonly practiced cooling of saline solutions in cooling towers (DD 139 354 and DD 155 316).

Also, it is generally known that solar cells are increasingly being used for heating consumer water. For greater heat energy requirements, it is known from the prior art to apply the principle of solar cells to a so-called solar pond, i.e., a pool filled with liquids of different densities which converts the incident solar radiation into heat energy. Typical examples describing the prior art with respect to solar ponds are found in DE 34 22 481, G 85 27 665.0, and the publication "Salt Ponds: Energy Phenomenon" (Compressed Air Magazine, January 1986).

The dissolution of salt deposits by means of solution mining is generally known and the solution mining of NaCl using water as the solvent is very common. Selective solution mining of potassium deposits with the use of a heated solvent is described in the following prior art references: DD 206179, DD 208389, DD 271731, DD 271732, DD 277718, DD 291601, and the publication "Operation of a potassium ore pilot cavern", Colome and Rose, SMRI meeting, October 1994, Hannover.

Thus, it is an object of the present invention to provide a process and a system for the solution mining of evaporites and preparation of saline solutions, which process and system can be used under subtropical and tropical climatic conditions while avoiding the disadvantages resulting from high air humidity and considerable amounts of precipitation.

SUMMARY OF THE INVENTION

According to the process of the invention for the solution mining of evaporites and preparation of saline solutions, a solvent, selected in dependence on the respective process phase, is heated in a solar pond by means of solar energy to a temperature above the ambient temperature to about 60° C. to 80° C. The heated solvent is introduced into a cavern which is to be solution mined and the cavern temperature increases relative to the deposit temperature. The cavern is then solution mined. The resulting heated production brine is conducted to a cooling system and cooled therein at the surrounding temperature accompanied by water evaporation, whereby a crystallization of solids followed by a separation of solid and cold mother solution is effected as a result of cooling and water evaporation. This can be applied to the solution mining of salts in a particularly advantageous manner. In this case, the solvent for the solution mining is first heated in a solar pond and is then fed to the cavern and the highly concentrated saline solution obtained from the cavern is evaporated and cooled.

In one embodiment of the invention, the solutions conducted to the cooling system may be cooled to the surrounding temperature in a number of cycles. The number of cycles can be arrived at by dividing the temperature difference between the solution and the surroundings by the cooling time span which can be realized per pass through a cooling system. The necessary number of cooling cycles can be realized by the use of a plurality of cooling systems operated in parallel and/or by repeated circulation of the solutions in at least one cooling system.

It is preferable to preheat the solvent especially for producing salts having a highly temperature dependent solubility, since a disproportionately high concentration of valuable components is accordingly effected in the saline solution conveyed from the cavern and a disproportionately high crystallization of valuable components is thus achieved in subsequent evaporation and cooling.

The evaporation and cooling processes are assisted in a particularly advantageous manner by the integration of the dissolution process, since more salt is crystallized out of a saline solution of higher concentration which is achieved by dissolution of a deposit at an elevated temperature during the cooling accompanying the evaporation of the water.

Since the thermal energy required for evaporation is approximately 10 times that required for heating the same amount of water or solution owing to physical laws, the overall heat energy requirement can be reduced by conducting the dissolution process for generating the saline solution to be evaporated at a higher temperature level.

The integration, according to the invention, of a solar pond enables unhampered use of solar energy without impairment of function due to precipitation when the necessary liquids of different density are synthesized out of process-specific saline solutions. The saline solution to be heated has the highest density, and is the lowest layer, water is the uppermost layer with the lowest density. The water layer thickness is therefore configured in a variable manner.

Another advantage in combining a solar pond and cooling system according to the invention is the large heat storage capacity of the solar pond which also permits continuous operation with little or no sunlight, especially at night. This enables the system to benefit from the lower surrounding temperature at that time. The layer thickness of the solution to be evaporated in the solar pond can be varied according to the invention in order to increase the heat storage capacity.

There is also no substantially negative influence, due to precipitation in the system of the invention, of the device integrated within the cooling system. The device is suitable to retard or reduce the supersaturation of a solution exiting from a cooling device and at the same time to thicken or concentrate the occurring crystallizates, since the concentrated brine or a suspension of concentrated brine and crystallized salts exhibit small surfaces and abundant precipitation can be effectively removed temporarily.

In one embodiment of the invention, water is used as the solvent so that a non-selective solution mining of a cavern can be practiced. This form of solution mining is used especially to prepare the caverns for production. The resulting production brine has a composition which reflects the relations of the minerals in the deposit. In another aspect of the invention, the cold mother solution obtained after cooling and separation is recycled by returning it to the solar pond. However, the solution can be returned, in its entirety or in part, as a residue solution or rejected solution to the loop of an ancillary, separate installation operating in the selective solution mining phase. Optionally, the recycling can be by feeding the solution to the solar pond and/or a feed line to the heated production brine of the selective solution mining. The controlling of the cold mother solution depends upon the composition or concentration of the solution.

In an especially preferred embodiment of the invention, the phase of selective solution mining of the cavern is carried out as a function of the solvent composition and the composition of the solvent is selected in dependence on the composition of the deposit, the temperature of the deposit and the applicable equilibrium system of the solubility. In this way, the composition of the occurring production brine can be influenced in a particularly advantageous manner. To close the process loop, the occurring cold mother solution is fed to the solar pond after cooling and separation and/or, depending on the concentration of the process solution, is fed as rejected solution to the loop of an additional ancillary separate installation.

According to another embodiment of the invention, an evaporating brine can be generated from the rejected solution by solar heating in the solar pond to evaporate the solution to a maximum concentration, wherein the heated evaporating brine is fed to a cooling system and cooled therein at the surrounding temperature accompanied by evaporation of water. The solids crystallize and separate from the cold mother solution due to the cooling, and the cold mother solution is fed into the loop by mixing with the rejected solution and returning it to the solar pond until achieving a concentration and reduction of the solution suitable for re-use. The concentrated solution obtained in this manner is suitable for disposal in solution-mined caverns or external disposal cavities or is a saleable product. According to another feature of the invention, the solution displaced from the caverns as a result of the underbedding or underlayering in the cavern by dumped brine, can also be added to a production brine of the process.

In another preferred embodiment of the invention, the solvent is fed directly to a hot deposit which is to be solution mined and the solar pond is circumvented. In this way, the cavern is solution mined and the production brine, which is heated by the deposit temperature, is fed to a cooling system wherein the brine is cooled at the surrounding temperature accompanied by water evaporation. The cooling brings about a crystallization of solids and a subsequent separation of solids and cold mother solution. This variant is particularly advantageous for solution mining of "hot deposits".

The subject matter of the invention also includes a process for preparing naturally occurring saline solutions. According to this process, a naturally occurring saline solution (salt lake, seawater) is heated in a solar pond by solar energy to a temperature above the surrounding temperature to approximately 60° C. to 80° C. The heated production brine is then fed to a cooling system and cooled therein at the surrounding temperature accompanied by water evaporation. The cooling brings about a crystallization of solids and subsequent separation of solids and cold mother solution.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PRESENTLY PREFERRED EMBODIMENTS

Figure 1:
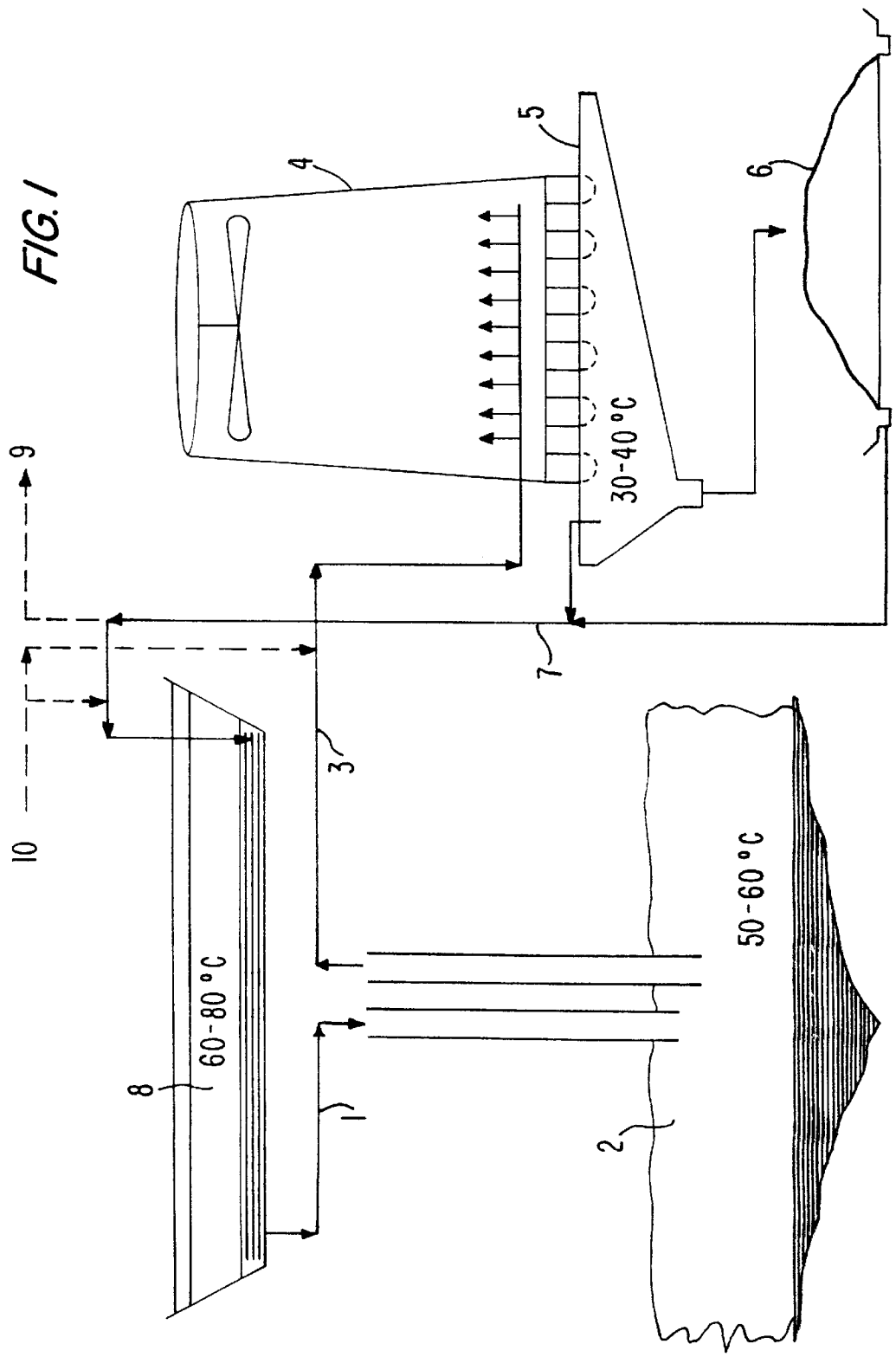
FIG. 1 shows a process diagram for selective solution mining of a cavern.

The process and system of the invention enables one to heat a solvent for the solution mining of evaporites from a deposit by means of solar energy so as to benefit from an increased solubility of the valuable components to be extracted and to effectively cool the highly saturated solution obtained from the caverns to the surrounding temperature so that the valuable components are crystallized out by means of cooling and evaporation. The respective equilibrium systems of solubility are used, in accordance with the composition of the deposit, as physical-chemical bases. The following are typical examples:

| | |
|---|---|
| binary system | $NaCl-H_2O$; |
| ternary system | $KCl-NaCl-H_2O$; |
| ternary system | $NaHCO_3-Na_2CO_3-H_2O$; |
| quaternary system | $MgCl_2-KCl-NaCl-H_2O$; |
| quaternary system | $NaHCO_3-Na_2CO_3-NaCl-H_2O$; |
| quinary system | $MgSO_4-MgCl_2-KCl-NaCl-H_2O$; |
| quinary system | $CaCl_2-MgCl_2-KCl-NaCl-H_2O$; and |
| senary system | $CaSO_4-MgSO_4-MgCl_2-KCl-NaCl-H_2O$. |

When the solution mining of evaporites and preparation of the extracted saline solution is practiced to produce marketable products, different levels of concentrations are found in the process solutions according to the respective process phases.

Generally, these are:

i) process solutions from the production phase of the caverns and brine preparation;

ii) low-concentration process solutions from the preparation phase of cavern development and nonselective solution mining of the deposit or scavenging or rinsing solutions from brine preparation, and iii) high-concentration process solutions from the production phase for sale or disposal.

The following individual examples explain the process according to the invention for the typical process phases cited above. It should be noted that due to the large number of possible variants resulting from different deposit composition, different deposit temperature, and applicable equilibrium system of solubility, each of the embodiment examples describes only one specific case of application.

EXAMPLE 1

In the extraction of carnallite ($MgCl_2.KCl.6H_2O$) to obtain production of KCl from an exemplary deposit, the essential accompanying mineral found in addition to the carnallite (approximately 30–80%) is halite (NaCl). Other accompanying minerals to be taken into account are sylvite (KCl) and tachyhydrite ($CaCl_2.2\ MgCl_2.6\ H_2O$).

This deposit composition determines the composition of all process solutions in general and particularly in extraction by solution mining and accordingly also the equilibrium system of solubility in which the processes of heating, dissolution, cooling, evaporation and crystallization occur. The applicable system in the present case is the $CaCl_2-MgCl_2-KCl-NaCl-H_2O$ system.

The basic principle to be applied for the extraction of KCl from carnallite with simultaneous extraction of sylvite is the implemented use of the KCl solubility-temperature dependency in a closed or loop process of heating and dissolution and cooling and crystallization.

The process according to the invention is explained more fully with reference to FIG. 1. In a carnallite cavern 2 prepared for production, an unsaturated carnallite-specific solvent 1 of the following composition is pumped in at a volumetric flow rate of 40–80 m³/h per cavern:

Solvent 1
$CaCl_2$: 13 g/1000 g $H_2O$
$MgCl_2$: 300 g/1000 g $H_2O$
KCl: 76 g/1000 g $H_2O$
NaCl: 56 g/1000 g $H_2O$
Density: 1.240 g/cm³.

The cavern temperature is increased relative to the deposit temperature (approximately 28° C.) to approximately 50–60° C. by injecting the heated solvent at 60 to 80° C. Due to the increase in temperature, carnallite selectively dissolves in the solution in the cavern 2 due to the choice of the special solvent composition, and halite enters the solution only to a very limited degree.

A production brine 3 of the following composition is obtained from the cavern:

Production Brine 3
$CaCl_2$: 15 g/1000 g $H_2O$
$MgCl_2$: 306 g/1000 g $H_2O$
KCl: 85 g/1000 g $H_2O$
NaCl: 60 g/1000 g $H_2O$
Density: ≈1.258 g/cm³
Temperature: ≈55° C.

The accompanying minerals sylvite and tachyhydrite are likewise dissolved due to their good solubility.

The production brine 3 obtained from cavern 2 is introduced into a cooling system which contains a cooling tower 4 and a crystallizer/thickener 5 which together form the cooling system. In this cooling system, the production brine 3 is cooled to the surrounding temperature, preferably in a number of cycles given by the temperature difference between the production brine and the surroundings divided by the achievable cooling period per pass through a cooling tower. The required number of cooling cycles can be realized by means of a plurality of cooling tower/crystallizer/thickener units operated in parallel or by a unit with repeated circulation of the solution quantities through the cooling tower and crystallizer/thickener. Water evaporation is effected at the same time based on the technical basic principle of cooling used in the cooling tower 4.

As a result of the cooling and simultaneous water evaporation, solids in the brine crystallize in the crystallizer/thickener 5 corresponding to the solubility equilibrium in the $CaCl_2-MgCl_2-KCl-NaCl-H_2O$ system. The separation of the crystallized solids 6 and cold carnallite mother solution 7 is effected in the crystallizer/thickener 5.

The compositions of the crystallized solid and cold mother solution are as follows:

Crystallized Solid 6
KCl: 1.5 t per 100 m³ production brine
NaCl: 1.3 t per 100 m³ production brine
Temperature: ≈35–40° C.

Mother Solution 7
$CaCl_2$: 16 g/1000g $H_2O$
$MgCl_2$: 317 g/1000 g $H_2O$
KCl: 71 g/1000 g $H_2O$
NaCl: 48 g/1000 g $H_2O$
Density: ≈1.265 g/cm³
Temperature: ≈35–40° C.

The crystallized solid is a mixture of KCl and NaCl. The mixture can be stored temporarily and prepared in subsequent process steps to produce marketable products.

After the cooling and separation of the KCl and to close the required process loop, the carnallite mother solution 7 is fed to a solar pond 8. In the solar pond, the carnallite mother solution is heated to 60 to 80° C. by means of solar energy, wherein there is an undersaturation of KCl.

Accordingly, the heated carnallite mother solution can be fed to the cavern again as solvent 1 for dissolving the carnallite.

By controlling the process in a loop operation, a concentration of $MgCl_2$ occurs in the process solutions. This is desirable only in determined process phases, e.g., after rinsing interim periods. Therefore, it is necessary that the $MgCl_2$ quantity entering the process during the carnallite dissolution be removed from the process again. This removal is by means of the rejection (9) or bleed off of cold carnallite mother solution.

Depending upon the evaporation achieved during the cooling of the production brine 3 in the cooling tower 4, it is possible for solutions with low $MgCl_2$ which often have higher concentrations of KCl, e.g., rejected solution 10 from a process cycle as shown in embodiment Example 2, to be fed into the described process loop. These solutions should be supplied to the process in dependence on the KCl content at two different locations. In the case of higher KCl contents, solutions with lower $MgCl_2$ are fed into the production brine 3. In the case of low KCl contents, solutions with low $MgCl_2$ are fed into the carnallite mother solution 7 prior to its introduction to the solar pond. The decision between high and low KCl contents is made by calculating the balance of the mixing process of the solutions with low $MgCl_2$ with the carnallite mother solution. If KCl is crystallized out in accordance with the balance, this results in a case of "higher KCl content" and the addition is made to the production brine 3. On the other hand, if no KCl crystallization is expected in the mixing of the solutions with lower $MgCl_2$ with the carnallite mother solution, this is a case of "low KCl content" and the addition is made to the carnallite mother solution 7.

A rejected solution 10 having the following composition results in the case of "higher KCl content":

Rejected Solution 10
$CaCl_2$: 3 g/1000 g $H_2O$
$MgCl_2$: 168 g/1000 g $H_2O$
KCl: 121 g/1000 g $H_2O$
NaCl: 137 g/1000 g $H_2O$
Density: ≈1.235 g/cm³
Temperature: ≈35–40° C.

Based on a water balance in the process, 25 m³ of the rejected solution 10 per 100 m³ of production brine can be added to the production brine 3 before feeding into the cooling system. In this way, the above-indicated quantities of crystallized solid 6 and carnallite mother solution 7 change in the following manner:

Crystallized Solid 6
KCl: 2.7 t per 100 m³ production brine
NaCl: 2.9 t per 100 m³ production brine
Temperature: ≈35–40° C.
Carnallite Mother Solution 7
$CaCl_2$: 15 g/1000 g $H_2O$
$MgCl_2$: 300 g/1000 g $H_2O$
KCl: 76 g/1000 g $H_2O$
NaCl: 56 g/1000 g $H_2O$
Density: ≈1.261 g/cm³
Temperature: ≈35–40° C.

The circular process is now closed not only in technical terms, but also with respect to the balance of $MgCl_2$ and water.

Generally speaking, this means that the heating, saturation, cooling, evaporation and crystallization cycle is realized in the embodiment of Example 1 with the primary goal of saturation, evaporation and cooling at a constant $MgCl_2$ concentration level.

EXAMPLE 2

Figure 2:
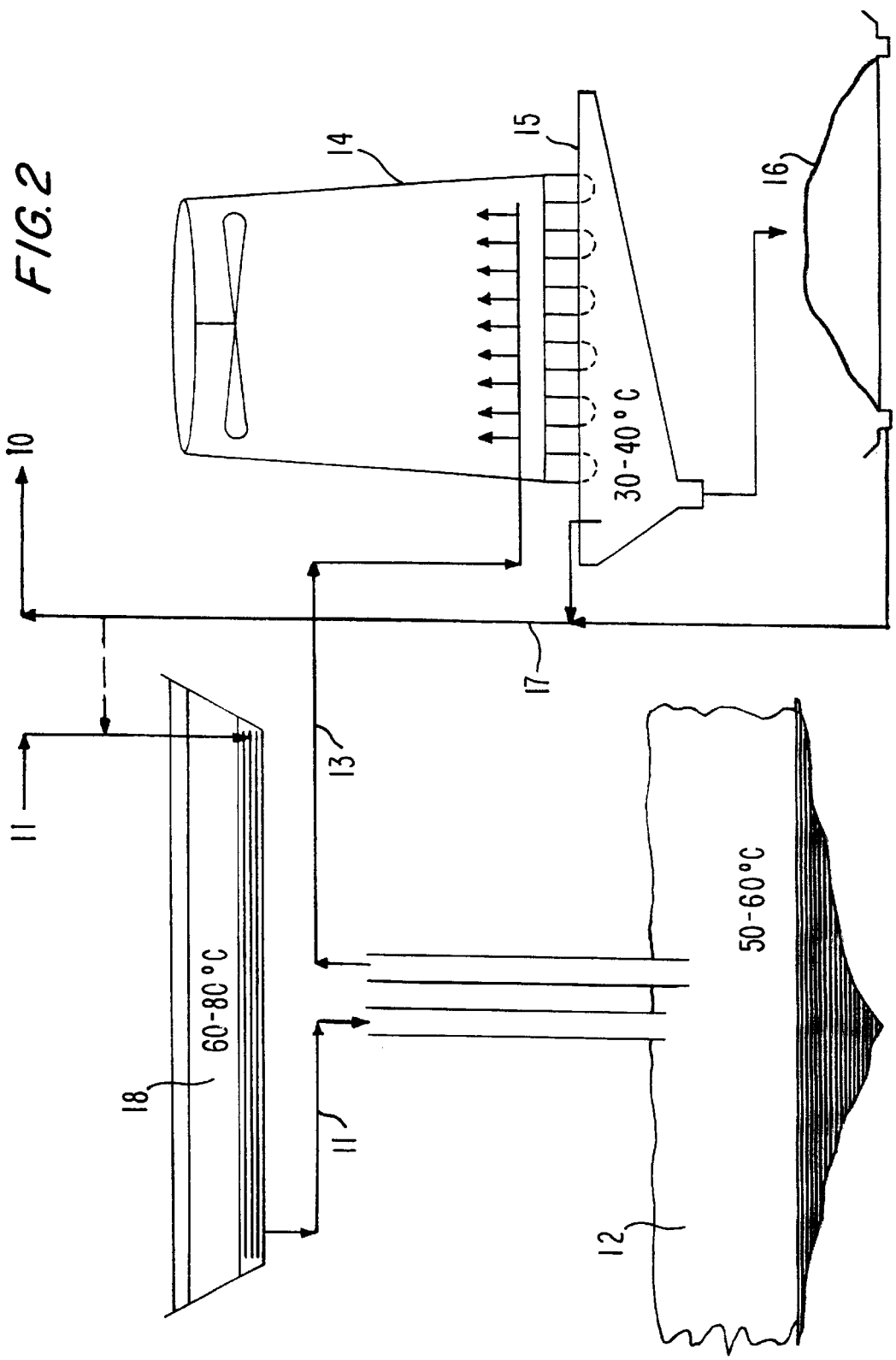
FIG. 2 shows a process diagram with water as solvent for nonselective solution mining.

Example 2 is explained more fully with reference FIG. 2. FIG. 2 shows another embodiment of the process of the invention which also uses the example of the carnallite deposit already described in Example 1. Therefore, the theoretical foundations described in Example 1 also apply to Example 2.

Generally, starting cavities are solution mined to prepare the caverns for production. This is effected by means of water at a volumetric rate of 5 to 25 m³/h per cavern.

Water 11, prior to its injection into the cavern 12, is fed to a solar pond 18. In the solar pond, the water 11 is heated to 60–80° C. by means of solar energy. The cavern temperature is increased relative to the deposit temperature (approximately 28° C.) to approximately 50–60° C. by injecting the heated water at 60 to 80° C. In the cavern 12 carnallite is dissolved in a nonselective manner due to the choice of water as solvent, i.e., halite also enters into the solution to a large extent.

A production brine 13 is obtained whose composition reflects the relations of the minerals in the deposit. The composition of the production brine 13 below may be viewed as typical, including the alternatives indicated in the following:

Production Brine 13
$CaCl_2$: 3 g/1000 g $H_2O$
$MgCl_2$: 127 g/1000 g $H_2O$
KCl: 90 g/1000 g $H_2O$
NaCl: 140 g/1000 g $H_2O$
Density: ≈1.19 g/cm³
Temperature: ≈55° C.

The accompanying minerals sylvite and tachyhydrite were likewise dissolved due to their good solubility.

The production brine 13 obtained from the cavern 12 is then fed to a cooling system which comprises a cooling tower 14 and a crystallizer/thickener 15. In the cooling system, the production brine 13 is cooled to the surrounding temperature, at least in a number of cycles given by the temperature difference between the production brine and surroundings divided by the achievable cooling period per pass through a cooling tower, and is simultaneously evaporated based on the technical basic principle of cooling in the cooling tower 14. As a result of the cooling and evaporation, a maximum KCl concentration should preferably be achieved in the solution which is defined by the applicable system solubility equilibrium. In so doing, the required number of cooling cycles can be realized by means of a plurality of parallel-operated cooling tower/crystallizer/thickener units or by a unit with repeated circulation of the solution quantities through the cooling tower and crystallizer/thickener.

As a result of the cooling and simultaneous water evaporation, the solid is crystallized in the crystallizer/thickener 15 corresponding to the solubility equilibrium in the $CaCl_2$—$MgCl_2$—KCl—NaCl—$H_2O$ system. The separation of the crystallized solid 16 and cold carnallite mother solution 17 is effected in the crystallizer/thickener 15.

The composition is as follows:
Crystallized Solid 16
KCl: 0 t per 100 m³ production brine
NaCl: 3.3 t per 100 m³ production brine
Temperature: ≈35–40° C.
Carnallite Mother Solution 7
$CaCl_2$: 3 g/1000 g $H_2O$
$MgCl_2$: 168 g/1000 g $H_2O$
KCl: 121 g/1000 g $H_2O$
NaCl: 137 g/1000 g $H_2O$ Density: ≈1.235 g/cm³

Temperature: ≈35–40° C.

In this case, the crystallized solid is NaCl which is stored temporarily and prepared in subsequent process steps to form marketable products. In principle, however, a mixture of KCl and NaCl can also be crystallized within the framework of the technical configuration of the process.

Alternatively, when substantially lower concentrations of production brine 13 occur in certain production phases in comparison to the composition mentioned above, the concentration can be increased until a maximum KCl concentration is achieved in the solution which is defined by the applicable solubility system by returning a portion, or all, of the cooled carnallite mother solution 17 to the process loop. The cooled carnallite mother solution 17 is returned to the volume flow of the water 11 before the solar pond or in a separate solar pond/cavern system.

By controlling the process in a loop operation, an increased concentration occurs in the process solutions. In order to balance the process, cold carnallite mother solution is removed from the process as rejected solution 10.

Generally speaking, this means that the heating, saturation, cooling, evaporation and crystallization cycle is realized in Example 2 with the primary goal of saturation and evaporation with a sliding input concentration level of $MgCl_2$.

EXAMPLE 3

Figure 3:
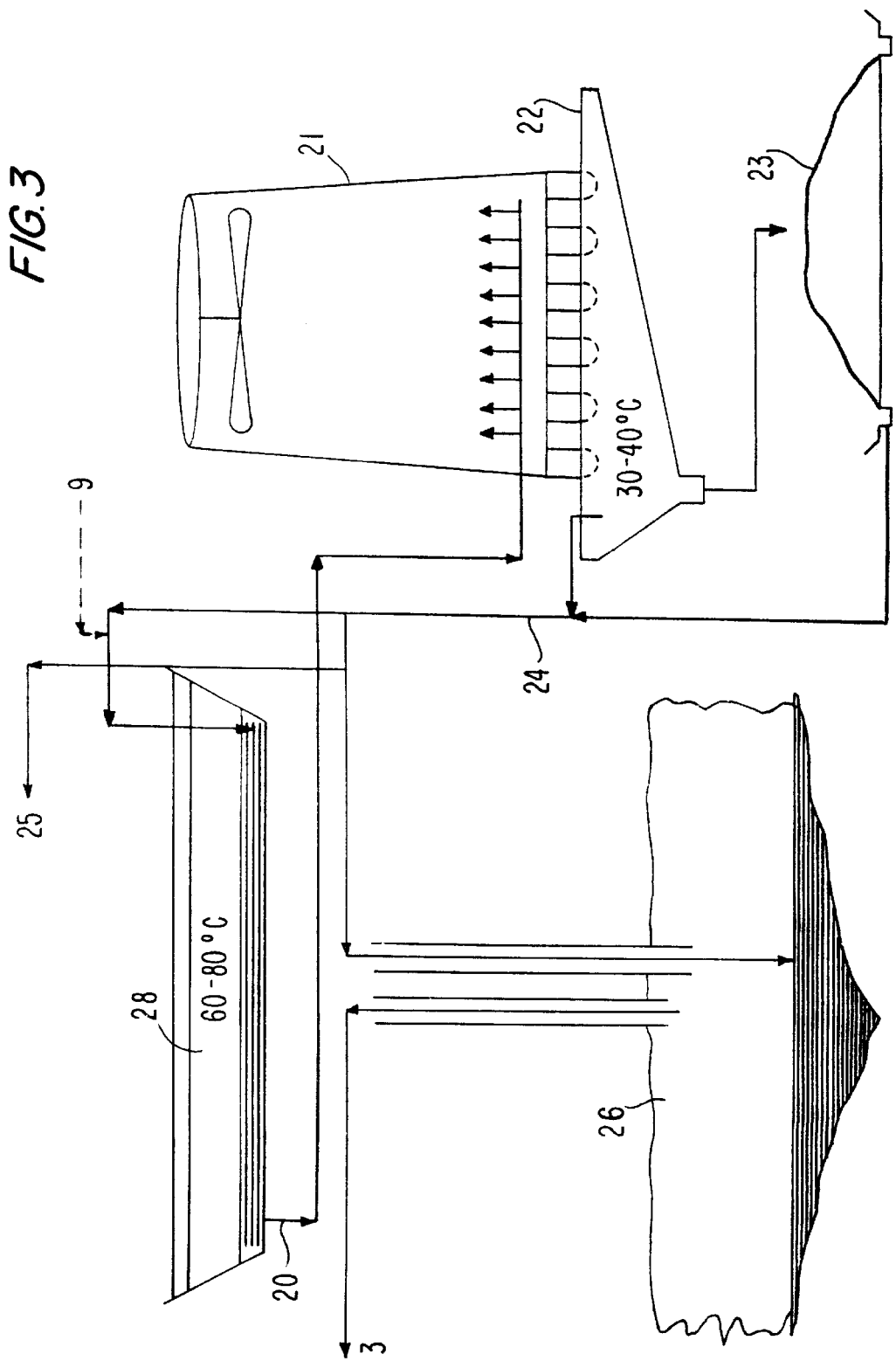
FIG. 3 shows a process diagram for a process by which an evaporation solution generated in the solar pond is further processed.

Example 3 is explained more fully with reference to FIG. 3. Example 3 describes another embodiment of the process of the invention, likewise with the example of the carnallite deposit indicated in embodiment Example 1. Therefore, the theoretical foundations described at the beginning in embodiment example 1 also apply to embodiment Example 3.

In order to balance out the overall process with respect to $MgCl_2$, it is necessary to eliminate $MgCl_2$ from the process as was already explained in Example 1. Since the concentration of the rejected solution 9 for disposal which comes from a process analogous to Example 1 is normally too low, the heating, saturation, cooling, evaporating, and crystallization cycle is oriented toward maximum $MgCl_2$ concentration with the primary goal of evaporation. For this purpose, carnallite mother solution 24 is mixed with rejected solution 9 and fed to a solar pond 19. The solution mixture is heated to 60–80° C. in the solar pond by means of solar energy and the evaporation solution 20 is accordingly produced.

The evaporation solution 20 is now fed to a cooling system which comprises a cooling tower 21 and a crystallizer/thickener 22. In this cooling system, the evaporation solution 20 is cooled to the surrounding temperature, at least in a number of cycles given by the temperature difference between the evaporation solution and the surroundings divided by the achievable cooling period per pass through a cooling tower, and is simultaneously evaporated based on the technical basic principle of cooling in the cooling tower 21. In so doing, the required number of cooling cycles can be realized by means of a plurality of parallel-operated cooling tower/crystallizer/thickener units or by one unit with repeated circulation of the solution quantities through the cooling tower and crystallizer/thickener.

As a result of the cooling and simultaneous water evaporation, carnallite is crystallized in the crystallizer/thickener 22 corresponding to the solubility equilibrium in the $CaCl_2$—$MgCl_2$—KCl—NaCl—$H_2O$ system. The separation of the crystallized solid 23 and cold carnallite mother solution 24 is effected in the crystallizer/thickener 22.

After the completion of approximately 10 evaporation cycles (heating, evaporation, cooling, crystallization and solid/liquid separation), the following quantity of crystallized solid results and the composition of the carnallite mother solution is as follows:

Crystallized Solid 23 carnallite: 24.5 t per 100 m³ rejected solution (9)

NaCl: 4.5 t per 100 m³ rejected solution (9)

Temperature: ≈35–40° C.

Carnallite Mother Solution 24

$CaCl_2$: 32 g/1000 g $H_2O$ $MgCl_2$: 560 g/1000 g $H_2O$

KCl: 3 g/1000 g $H_2O$

NaCl: 4 g/1000 g $H_2O$

Density: ≈1.355 g/cm³

Temperature: ≈35–40° C.

In this case, the crystallized solid is a mixture of carnallite and NaCl which is stored temporarily and prepared in subsequent process steps to form marketable products.

By controlling the process in a loop operation, there is a desired reduction in the process solutions of approximately 50%, in addition to the increased concentration. The concentration mentioned above is suitable for disposal of the carnallite mother solution 24 in solution-mined carnallite caverns or in external disposal cavities 26. This highly concentrated brine 25 is a saleable product.

In the case of internal disposal in solution-mined carnallite caverns, the underlayering and displacement in the cavern results in a solution which corresponds to the production brine 3 in embodiment Example 1 and can be additionally fed therein.

The invention is not limited by the embodiments described above which are presented as examples only but can be modified in various ways within the scope of protection defined by the appended patent claims.

We claim:

1. A process for the solution mining of evaporites from a cavern having a deposit to be mined and preparation of the obtained saline solution, comprising: heating a pre-selected solvent in a solar pond by means of solar energy to a temperature above ambient temperature to approximately 60° C. to 80° C.;

introducing the heated solvent into the cavern to be solution-mined, whereby the cavern temperature increases relative to the deposit temperature and the cavern is solution mined to produce a production brine; and cooling the heated production brine at a surrounding temperature and evaporating water whereby solids crystallize and separate producing a solid product and a cold mother solution.

2. The process of claim 1 wherein the solvent is selected in dependence on a respective process phase.

3. The process of claim 1 wherein the solvent comprises water and a nonselective solution mining of the cavern is effected.

4. The process of claim 1 further comprising recycling the cold mother solution formed by cooling and separation by at least one of returning it to the solar pond and routing it as a rejected solution to an ancillary, separate installation operating in the selective solution mining phase.

5. The process of claim 1 wherein the cold mother solution obtained by cooling and separation is supplied to at least one of the solar pond as a rejected solution and to the heated production brine of an ancillary, separate installation operating in the selective solution mining phase.

6. The process of claim 2 wherein the phase of selective solution mining of the cavern is effected as a function of the composition of the solvent, wherein the composition of the solvent is selected in dependence on at least one of the composition of the deposit, the temperature of the deposit and the applicable equilibrium system of solubility.

7. The process of claim 6 wherein the cold mother solution is recycled by at least one of returning it to the solar pond and feeding it as a rejected solution to an additional ancillary separate installation.

8. The process of claim 1 wherein the cavern contains a hot deposit to be solution mined and the solvent is fed directly to the hot deposit while circumventing the solar pond, whereby a solution mining of the cavern is effected and the production brine which is heated by the hot deposit temperature is fed to a cooling system and cooled therein at the surrounding temperature accompanied by water evaporation, and the cooling brings about a crystallization of solids and subsequent separation of solids and cold mother solution.

9. A system for the solution mining of evaporites from a cavern having a deposit to be mined and preparation of an obtained saline solution, as well as preparation of naturally occurring saline solution comprising:

at least one solar pond for heating a solvent; and at least a cooling system in fluid communication with said solar pond, wherein the cooling system comprises a cooling tower which is operationally linked with a device suitable for retarding the supersaturation of a solution emerging from the cooling tower and simultaneously thickening the occurring crystallizates.

10. The system of claim 9, wherein in that the solar pond comprises process solutions of different density with variable layer thickness, wherein the uppermost layer with the lowest density is water.

11. The system of claim 9 wherein at least one of the solar pond, cooling tower and a device arranged below the cooling tower are connected with at least one of the salt deposit and a disposal cavity via suitable feed lines and connecting lines.

12. The system of claim 9 wherein at least one of the pond or cooling system is in fluid communication with at least one ancillary installation.

13. A process for the solution mining of evaporites from a cavern having a deposit to be mined and preparation of an obtained saline solution, comprising the steps of:

heating a pre-selected solvent in a solar pond by means of solar energy to a temperature above ambient temperature to approximately 60° C. to 80° C.;

introducing the heated solvent into the cavern to be solution-mined, whereby the cavern temperature increases relative to the deposit temperature and the cavern is solution mined to produce a production brine;

cooling the heated production brine at a surrounding temperature and evaporating water whereby solids crystallize and separate producing a solid product and a cold mother solution;

recycling the cold mother solution by at least one of returning it to the solar pond and feeding it as a rejected solution to an additional ancillary separate installation, the rejected solution being heated in the solar pond by means of solar energy to a temperature above ambient temperature to approximately 60° C. to 80° C., wherein an evaporating brine is formed;

feeding the heated evaporating brine to a cooling system in which the brine is cooled at the ambient temperature accompanied by evaporation of water, a crystallization of solids and a separation of solids and formation of the cold mother solution is affected due to the cooling; and mixing the cold mother solution with the rejected solution to provide a mixture which is returned to the solar pond until achieving a concentration and a reduction of the solution suitable for re-use.

14. The process of claim 13 further comprising disposing of the rejected solution in at least one of a cavern which has already been solution mined and an external disposal cavity.

15. The process of claim 14 wherein in disposing of the solution displaced from the cavern, the solution is added to the production brine.

16. A process for the solution mining of evaporites from a cavern having a deposit to be mined and preparation of an obtained saline solution, comprising the steps of:

heating a pre-selected solvent in a solar pond by means of solar energy to a temperature above ambient temperature to approximately 60° C. to 80° C.;

introducing the heated solvent into the cavern to be solution-mined, whereby the cavern temperature increases relative to the deposit temperature and the cavern is solution mined to produce a production brine; and cooling the heated production brine at a surrounding temperature and evaporating water whereby solids crystallize and separate producing a solid product and a cold mother solution, the solution fed to the cooling system being cooled to the surrounding temperature in a number of cycles given by the temperature difference between the solution and surroundings divided by the achievable cooling period passed through a cooling system.

17. A process for preparing a naturally occurring saline solution, comprising:

heating a naturally occurring saline solution in a solar pond by solar energy above ambient temperature to approximately 60° C. to 80° C. to form a production brine; and cooling the production brine at a surrounding temperature accompanied by water evaporation, wherein the cooling brings about a crystallization of solids and subsequent separation of solids and cold mother solution, the solution being cooled to the surrounding temperature in a number of cycles given by the temperature difference between the solution and surroundings divided by the achievable cooling period per pass through a cooling system.

18. The process of claim 17 wherein cooling is by a required number of cooling cycles and is realized at least one of by means of a plurality of cooling systems operated in parallel and by repeated circulation of the solutions in at least one cooling system.

* * * * *